United States Patent
Verhaagen et al.

(10) Patent No.: US 9,228,866 B2
(45) Date of Patent: Jan. 5, 2016

(54) PROCESS FLUID FLOW TRANSMITTER WITH FINNED COPLANAR PROCESS FLUID FLANGE

(71) Applicant: Dieterich Standard, Inc., Boulder, CO (US)

(72) Inventors: Donald R. Verhaagen, Boulder, CO (US); Dave Winters, Boulder, CO (US); Steve Harbaugh, Boulder, CO (US)

(73) Assignee: Dieterich Standard, Inc., Boulder, CO (US)

( * ) Notice: Subject to any disclaimer, the term of this patent is extended or adjusted under 35 U.S.C. 154(b) by 98 days.

(21) Appl. No.: 13/837,743

(22) Filed: Mar. 15, 2013

(65) Prior Publication Data

US 2013/0327157 A1 Dec. 12, 2013

Related U.S. Application Data

(60) Provisional application No. 61/656,235, filed on Jun. 6, 2012.

(51) Int. Cl.
| | |
|---|---|
| *G01F 1/34* | (2006.01) |
| *G01L 19/06* | (2006.01) |
| *F16L 23/02* | (2006.01) |
| *G01L 19/00* | (2006.01) |

(52) U.S. Cl.
CPC . *G01F 1/34* (2013.01); *F16L 23/02* (2013.01); *G01L 19/003* (2013.01); *G01L 19/0681* (2013.01)

(58) Field of Classification Search
None
See application file for complete search history.

(56) References Cited

U.S. PATENT DOCUMENTS

| | | | | |
|---|---|---|---|---|
| 4,672,728 A | * | 6/1987 | Nimberger | 29/890.142 |
| 4,745,810 A | | 5/1988 | Pierce et al. | |
| 5,038,611 A | * | 8/1991 | Weldon et al. | 73/290 V |
| 6,154,960 A | * | 12/2000 | Baldantoni et al. | 29/890.054 |
| 6,176,262 B1 | * | 1/2001 | Nimberger | 137/597 |

(Continued)

FOREIGN PATENT DOCUMENTS

| | | |
|---|---|---|
| CN | 1646885 | 7/2005 |
| CN | 102016517 | 4/2011 |

(Continued)

OTHER PUBLICATIONS

International Search Report and Written Opinion for PCT Application No. PCT/US2013/043845, dated Jul. 25, 2014, 13 pages.

(Continued)

*Primary Examiner* — Harshad R Patel
(74) *Attorney, Agent, or Firm* — Westman, Champlin & Koehler, P.A.

(57) ABSTRACT

A process fluid pressure measurement system is provided. The system includes a process fluid pressure transmitter having a pair of process fluid ports disposed coplanar with one another on a bottom surface thereof. The process fluid pressure transmitter is configured to measure a differential pressure between the pair of process fluid ports and provide an indication of the measured differential pressure over a process communication loop. A process fluid flange has a first surface configured to mount to the surface of the process fluid pressure transmitter, a second surface opposed to the first surface, and at least one lateral sidewall extending between the first and second surface. A plurality of fins are disposed proximate the lateral surface.

14 Claims, 4 Drawing Sheets

(56) References Cited

U.S. PATENT DOCUMENTS

| | | |
|---|---|---|
| 6,510,740 B1 | 1/2003 | Behm et al. |
| 6,675,658 B2 | 1/2004 | Petrich et al. |
| 7,497,123 B1 | 3/2009 | Behm et al. |
| 2007/0214896 A1* | 9/2007 | Orleskie et al. ............ 73/861.66 |

FOREIGN PATENT DOCUMENTS

| | | |
|---|---|---|
| CN | 102027333 | 4/2011 |
| EP | 1 600 742 A2 | 11/2005 |
| GB | 01701 A | 0/1914 |

OTHER PUBLICATIONS

Product Data Sheet 00813-0100-4733, Rev NB Rosemount Manifolds, Jan. 2011, pp. 15-20.

Quick Installation Guide 00825-0400-4809, Rev EA Flanged Flo-Tap 485 Annubar, Jul. 2010, pp. 1-20.

Industrial Pressure Transducers. Standard Industrial (S Model); Explosion-Proof (E Model); and Intrinsically Safe (T Model). Swagelock. Apr. 2011, pp. 1-16.

WIKA Data Sheet PE81.50. Intrinsically Safe Pressure Transmitter for applications in hazardous environments Models US-20-S, IS-21-S, IS-20-F, IS-21-F.

Invitation to Pay Additional Fees and, where applicable, Protest Fee for PCT Application No. PCT/US2013/043845, dated Nov. 25, 2013, 6 pages.

Examination Report from Australian Patent Application No. 2013271900, dated Mar. 19, 2015.

Communication from European Patent Application No. 13728303.2, dated Jan. 16, 2015.

Office Action from Chinese Patent Application No. 201380022827.6, dated Aug. 21, 2015.

\* cited by examiner

PROCESS FLUID FLOW TRANSMITTER WITH FINNED COPLANAR PROCESS FLUID FLANGE

CROSS-REFERENCE TO RELATED APPLICATION

The present application is based on and claims the benefit of U.S. provisional patent application Ser. No. 61/656,235, filed Jun. 6, 2012, the content of which is hereby incorporated by reference in its entirety.

BACKGROUND

Process monitoring and control systems are used to monitor and control operation of industrial processes. Industrial processes are used in manufacturing to produce various products such as refined oil, pharmaceuticals, paper, foods, et cetera. In large scale implementations, these processes must be monitored and controlled in order to operate within their desired parameters.

"Transmitter" has become a term which is used to describe the devices which couple to the process equipment and are used to sense a process variable. Example process variables include pressure, temperature, flow, and others. Frequently, a transmitter is located at a remote location (i.e., in the "field"), and transmits the sensed process variable back to a centrally located control room. Various techniques are used for transmitting the process variable including both wired and wireless communications. One common wired communication technique uses what is known as a two wire process control loop in which a single pair of wires is used to both carry information as well as provide power to the transmitter. One well established technique for transmitting information is by controlling the current level through the process control loop between 4 mA and 20 mA. The value of the current within the 4-20 mA range can be mapped to corresponding values of the process variable.

One type of transmitter is a pressure transmitter. In general, a pressure transmitter is any type of a transmitter which measures a pressure of a fluid of the process. (The term fluid includes gas, steam and liquids and their combination.) Pressure transmitters can be used to measure pressures directly including differential, absolute or gauge pressures. Further, using known techniques, pressure transmitters can be used to measure flows of the process fluid based upon a pressure differential in the process fluid between two locations.

Typically, a pressure transmitter includes a pressure sensor which couples to the pressure of the process fluid through an isolation system. The isolating system can comprise, for example, of an isolation diaphragm which is in physical contact with the process fluid and an isolation fill fluid which extends between the isolation diaphragm and the pressure sensor. The fill fluid preferably comprises a substantially incompressible fluid such as oil. As the process fluid exerts a pressure on the isolation diaphragm, changes in the applied pressure are conveyed across the diaphragm, through the isolation fluid and to the pressure sensor. Such isolation systems prevent the delicate components of the pressure sensor from being directly exposed to the process fluid.

In some process environments, the process fluid may experience relatively high temperatures. However, transmitters typically have a maximum operating temperature of 185-250° F. Even in cases where the transmitter can withstand the high temperature, temperature extremes can still introduce errors in pressure measurements. In processes which have temperatures which exceed the maximum operating temperature of the pressure transmitter, the transmitter itself must be located remotely from the process fluid and coupled to the process fluid using a long capillary tube. The capillary tube can run many feet and an isolation fluid is carried in tube. One end of the tube mounts to the process through an isolation diaphragm and the other end of the tube couples to the pressure transmitter. This long capillary tube and isolation diaphragm is generally referred to as a "remote seal", or "water legs" on steam flow measurement applications.

While a remote seal arrangement does still provide effective pressure measurement, there are some tradeoffs. When "water legs" are utilized and installed, incorrectly, errors can be induced into the actual pressure measurements. These water legs also require additional anti-freeze protection provisions in certain climates. Thus, providing a direct mount process fluid pressure measurement system that could be employed to higher temperatures would be beneficial to users who may not want to switch to a remote seal system for their high temperature application.

SUMMARY

A process fluid pressure measurement system is provided. The system includes a process fluid pressure transmitter having a pair of process fluid ports disposed coplanar with one another on a bottom surface thereof. The process fluid pressure transmitter is configured to measure a differential pressure between the pair of process fluid ports and provide an indication of the measured differential pressure over a process communication loop. A process fluid flange has a first surface configured to mount to the bottom surface of the process fluid pressure transmitter, a second surface opposed to the first surface, and at least one lateral sidewall extending between the first and second surface. A plurality of fins are disposed proximate the lateral surface.

DETAILED DESCRIPTION OF ILLUSTRATIVE EMBODIMENTS

Process fluid pressure transmitters are often direct-mounted above a process fluid flow element, such as an orifice plate or an averaging pitot tube, such as an Annubar® primary flow element, available from Emerson Process Management of Chanhassen, Minn. The primary flow element is disposed within the flow of process fluid, such as steam. In high temperature applications, the temperature of the process fluid can overheat the fill fluid of the process fluid pressure transmitter and damage the sensor(s) of the process fluid pressure transmitter. This can occur with process fluid temperatures of 185-250° F. and higher. This problem is made worse in situations where there is little or no air circulation proximate the process fluid pressure transmitter or in areas where the ambient temperature proximate the process fluid pressure transmitter is generally high, such as near a ceiling. While it is possible to direct mount a process fluid pressure transmitter below the process fluid flow element, there are a number of reasons why such an arrangement is not preferred. Specifically, the bottom of a process pipe is generally where any condensate, other undesirable liquid, particulate or other contaminant will settle. Such liquids and contaminants will flow into the impulse lines of the process fluid pressure measurement system. Based on pressure and/or temperature, this liquid may freeze and damage the system or the contaminants will build and clog the pressure sensor(s) rendering it inaccurate or inoperative. Further, a direct mount below a process fluid flow element may cause clearance issues with the ground or floor. Thus, it is important to provide a process fluid pressure measurement system that can be direct-mounted above a process fluid flow element or pipe and that can operate at higher temperatures than before.

Figure 1:
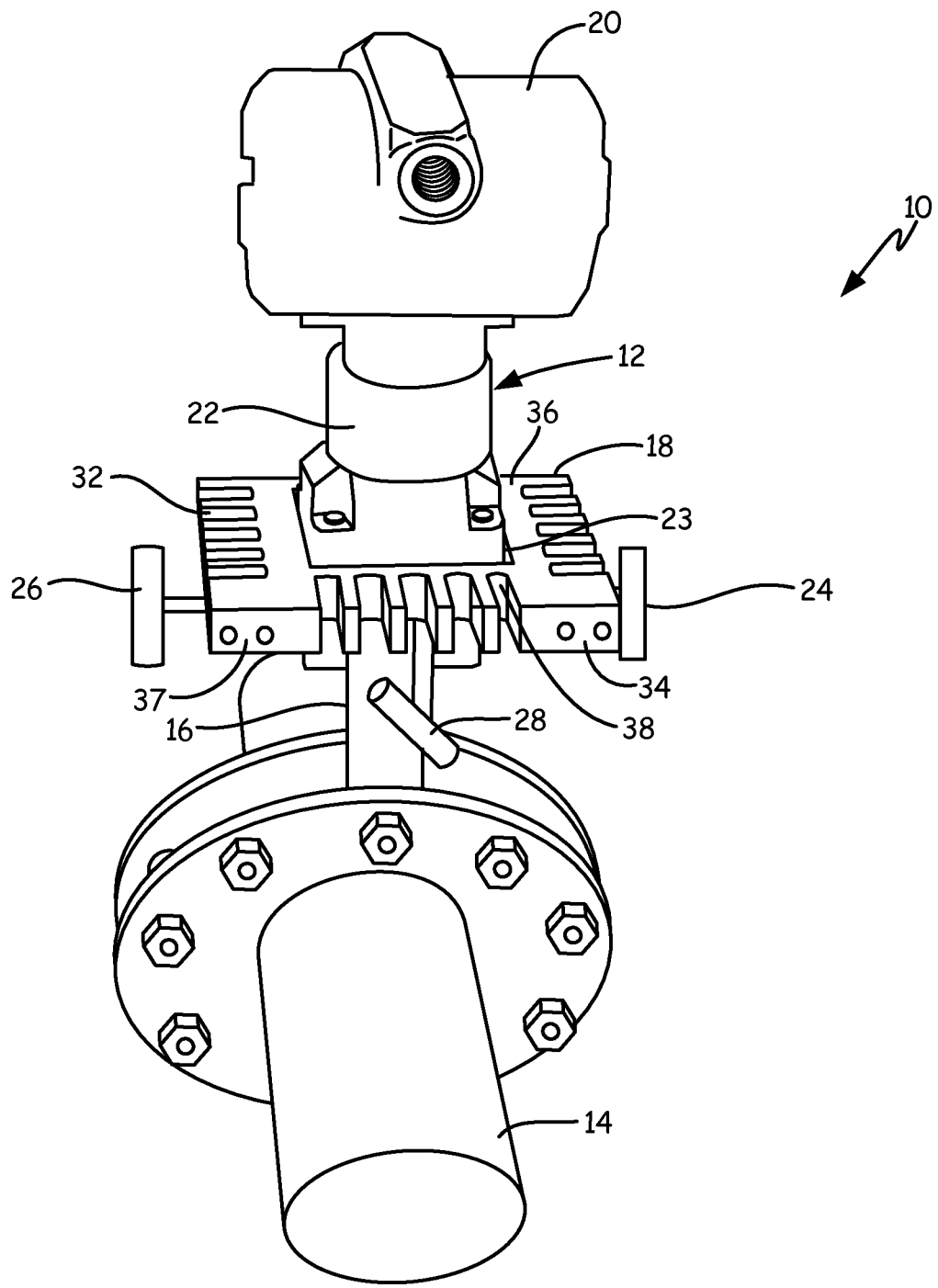
FIG. 1 is a diagrammatic view of a direct-mount process fluid pressure measurement system mounted to a process fluid pipe in accordance with an embodiment of the present invention.

FIG. 1 is a diagrammatic view of a direct-mount process fluid pressure measurement system mounted to a process fluid pipe in accordance with an embodiment of the present invention. System 10, includes process fluid pressure transmitter 12 coupled to process fluid pipe 14 by virtue of a pair of impulse lines 16 and coplanar process fluid flange 18. Transmitter 12 includes electronics compartment 20 and pressure sensor module 22. Pressure sensor module 22 includes a differential pressure sensor that has an electrical characteristic, such as capacitance, that varies with an applied differential pressure at a pair of isolation diaphragms on its bottom surface 23 (shown in FIG. 2). Pressure sensor module 22 also includes circuitry to measure the electrical characteristic and provide an indication of the measurement to transmitter electronics within compartment 20. Transmitter electronics receive the measurement information from pressure sensor module 22 and generate process variable information indicative of the process variable for transmission over a process control loop. The transmission of the process variable information can occur via a wired process control loop, via a wireless process control loop or both. In one embodiment, transmitter 12 can be a commercially available pressure transmitter sold under the trade designation Model 3051SFC available from Emerson Process Management. In some embodiments, transmitter 12 has circuitry in pressure sensor module 22 or electronics compartment 20 that can accommodate a maximum operating temperature of 185° F.-250° F. This same circuitry can also monitor the actual temperature within pressure sensor module 22.

Process fluid pipe 14 conveys process fluid, such as superheated steam, at a temperature that can be at or above the maximum operating temperature of process fluid pressure transmitter 12. Often, to sense a flow rate, or other flow related quantity, of the process fluid flowing within pipe 14, a process fluid flow element is introduced into the flow. For example, an averaging pitot tube primary flow element may be inserted within pipe 14 providing a pair of process fluid pressures related to the flow. In the case of an averaging pitot tube primary flow element, a first process fluid pressure may be indicative of the flowing pressure, and a second process fluid pressure may be indicative of a static pressure within pipe 14. Then, using Bernoulli's principle and knowledge of the pipe diameter, the fluid flow can be calculated. Alternatively, an orifice plate can be introduced into pipe 14 creating a localized flow constriction. In this embodiment, a first pressure process fluid pressure is related to the upstream fluid pressure, and a second process fluid pressure is related to the downstream pressure after the orifice plate. Using known equations, the process fluid flow can be calculated using these pressures.

In both embodiments above, a pair of process fluid pressures must be brought from the pipe to the process fluid pressure transmitter. Further, as set forth above, the process fluid may be at or above a maximum operating temperature of the process fluid pressure transmitter. While some previous work has physically spaced a direct-mounted pressure transmitter from a process (See U.S. Pat. No. 7,497,123 to Steven M. Behm, assigned to the Assignee of the present invention) there remains a need to provide a direct mounted process pressure sensing solution where the pressure transmitter is in close physical proximity to the process. This is especially so in applications where the space proximate the process fluid pressure transmitter is limited.

As shown in FIG. 1, process fluid pressure transmitter 12 is coupled to process fluid pipe 14 via coplanar process fluid flange 18. Specifically, pressure sensor module 22 of transmitter 12 is bolted to surface 36 of process fluid flange 18 using four bolts disposed proximate corners of pressure sensor module 22. A pair of isolation diaphragms proximate the bottom surface of pressure sensor module 22 are fluidically sealed to a pair of process fluid pressure ports in process fluid flange 18, preferably using o-rings. Additionally, impulse lines 16 are coupled to bottom surface 34 of process fluid flange 18 through any suitable connection techniques. Surfaces 34 and 36 are generally parallel and oppose one another. At least one lateral sidewall 37 extends between surfaces 34 and 36. In the embodiment illustrated in FIG. 1, flange 18 includes four lateral sidewalls, however embodiments of the present invention can be practiced using as few as one lateral sidewall. For example, in embodiments where the process fluid flange is circular, only a single lateral sidewall is provided.

A valve manifold may be coupled to surface 34 of flange 18 to provide a plurality of valves 24, 26, and 28 for performing manifold functions. For example, valves 24 and 26 may be isolation valves where such valves can be closed to isolate pressure sensor module 22 from the process in order to replace pressure sensor module 22. Additionally, valve 28 may be an equalization valve to allow fluidic communication between the pair of process fluid ports.

In order to reduce the heat that is presented to surface 23 of pressure sensor module 22 from process fluid, process fluid flange 18 includes a plurality of fins 32. Fins 32 generally run perpendicular to surface 23 of pressure sensor module 22 and preferably run the entire distance between surfaces 34 36 of process fluid flange manifold 18. Additionally, it is preferred that fins 32 be provided on all four lateral sidewalls of process fluid flange 18. However, embodiments of the present invention can be practiced with a number of variations. For example, one or more sides of flange 18 need not have fins 32; the number of fins on a given side can be varied; the length and/or width of the fins can be varied, et cetera. Fins 32 help provide additional surface area where heat, conducted from the process fluid, can be transferred to the ambient environment via convection and radiation instead of being conducted to the isolation diaphragms of pressure sensor module 22. Given that the process fluid may be at 400° F. or higher and the ambient environment may be at room temperature, or somewhat higher, the heat transfer characteristics of process fluid flange 18 are significant.

Figure 2:
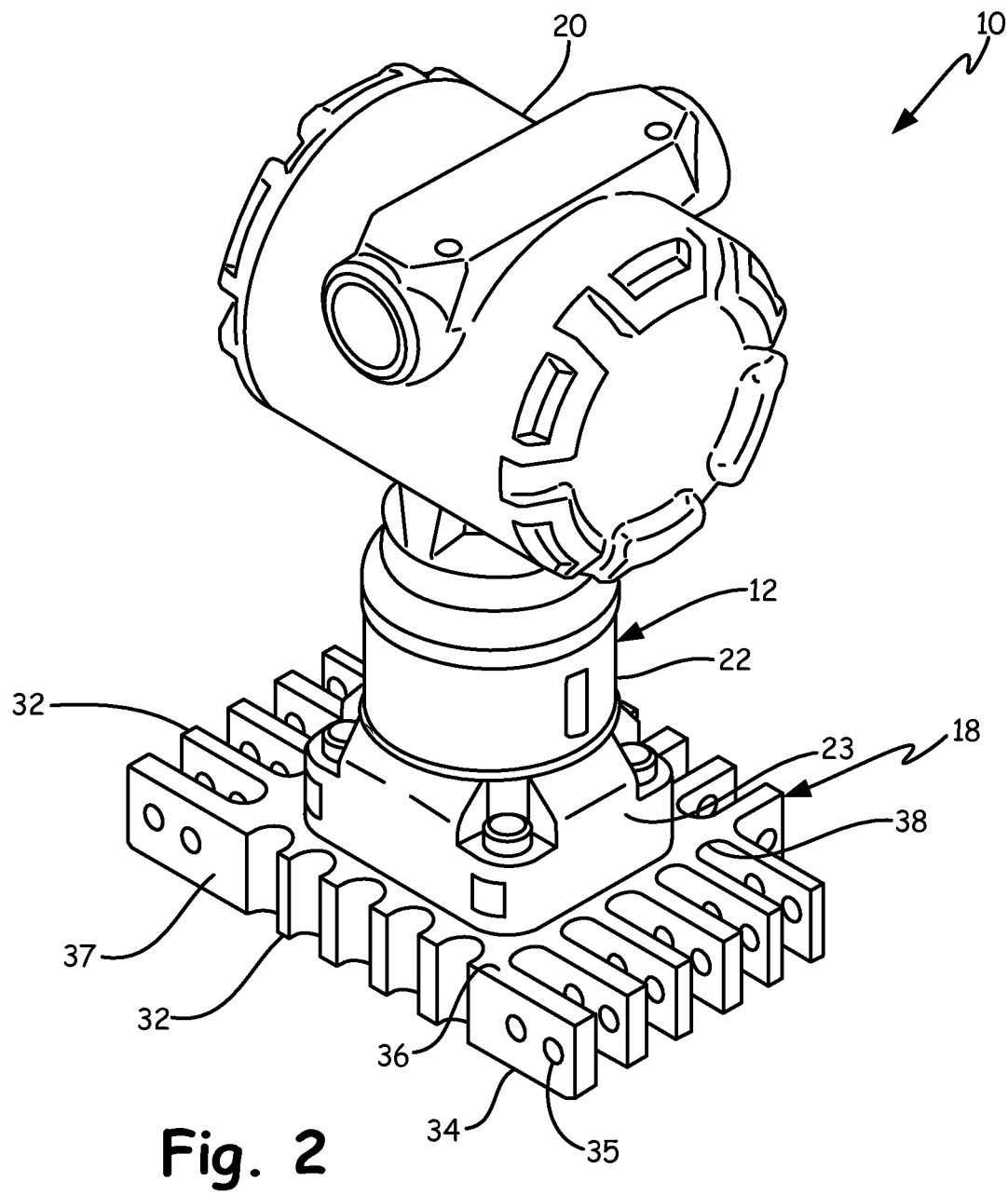
FIG. 2 is a diagrammatic view of a direct-mount process fluid pressure measurement system in accordance with an embodiment of the present invention.

FIG. 2 is a diagrammatic view of a portion of a direct-mount process fluid pressure measurement system in accordance with an embodiment of the present invention. FIG. 2 shows process fluid pressure transmitter 12 and coplanar process fluid flange 18 in greater detail. For example, FIG. 2 illustrates a number of fins 32 having a plurality of apertures 35 therethrough in order to increase the heat transfer abilities of each fin 32. As illustrated, each fin 32 preferably extends between surfaces 34 and 36 of flange 18. Further, adjacent fins preferably joins coplanar process fluid flange 18 via a fillet or curved portion 38, which provides additional strength to fins 32.

Figure 3:
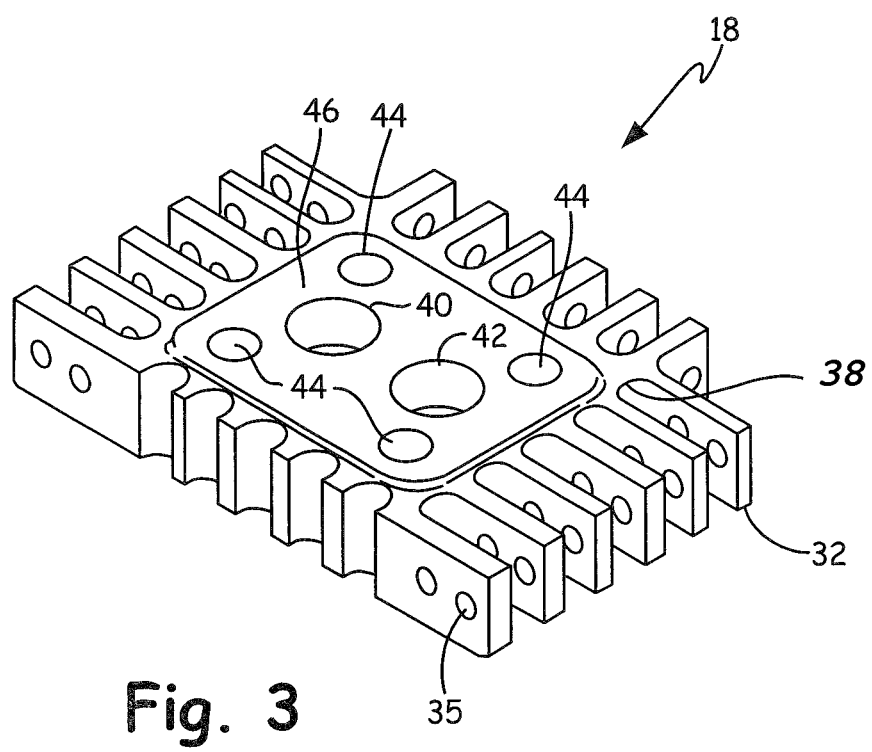
FIG. 3 is a diagrammatic perspective view of a coplanar process fluid flange in accordance with an embodiment of the present invention.

FIG. 3 is a diagrammatic perspective view of a coplanar process fluid flange in accordance with an embodiment of the present invention. Coplanar process fluid flange 18 includes a pair of process fluid ports 40, 42 disposed to couple to a process fluid pressure transmitter having a pair of coplanar isolation diaphragms. Additionally, flange 18 includes a plurality of mounting holes 44 sized to pass mounting bolts (not shown). As indicated in FIG. 3, apertures 35 are generally run transversely through fins 32 allowing air to pass through the fins 32. Further, in some embodiments, apertures 35 may be aligned with one another in order to facilitate manufacture. Finally, the surface finish of fins 32 can be selected to increase thermal transfer for example by causing the surface finish of fins 32 to be rougher than that of surface 46 where process fluid pressure transmitter 12 mounts.

Figure 4:
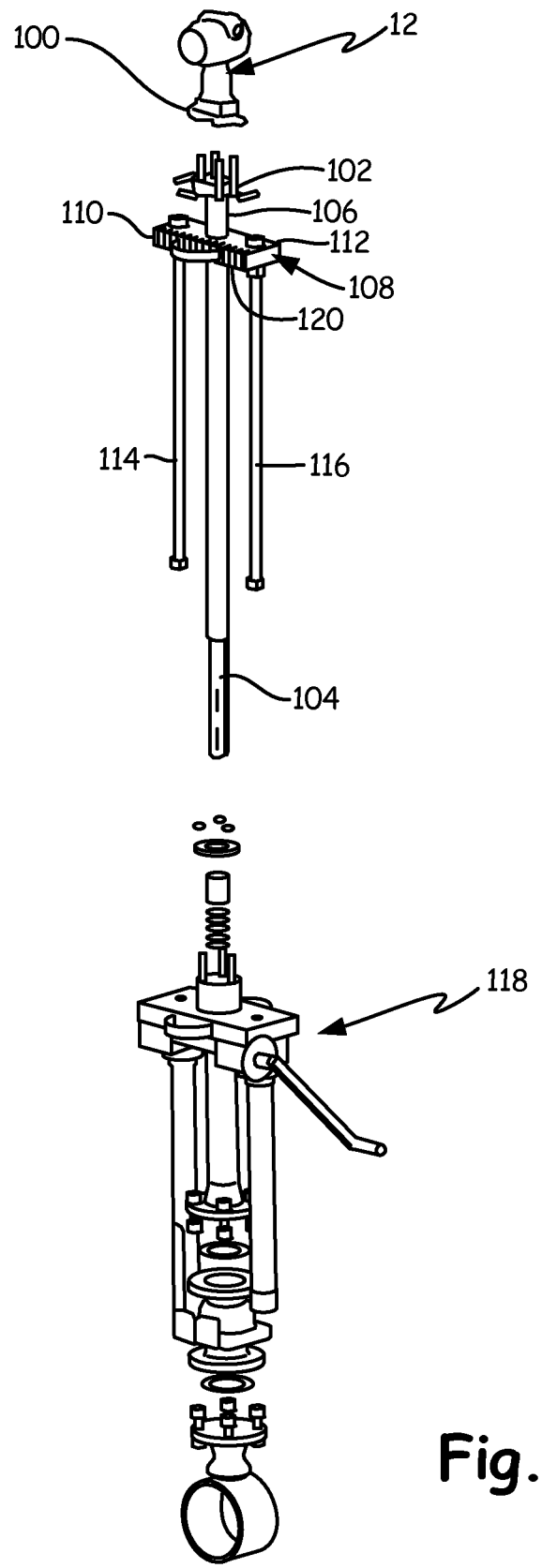
FIG. 4 is a diagrammatic exploded view of a direct-mount process fluid pressure measurement system in accordance with another embodiment of the present invention.

FIG. 4 is a diagrammatic exploded view of a direct-mount process fluid pressure measurement system in accordance with another embodiment of the present invention. Process pressure transmitter 12 is coupled to coplanar process fluid flange 100 which may be any suitable coplanar process fluid flange including a finned coplanar process fluid flange as described above with respect to FIGS. 1-3. Flange 100 preferably includes drain vents to allow the process fluid to be drained and/or vented as desired. Coplanar process fluid flange 100 is preferably coupled to multi-valve manifold 102, which is configured as a direct-mount transmitter connection for process fluid flange 100 and process fluid pressure transmitter 12. Manifold 102 is coupled to a pair of process fluid pressure inlets from primary flow element 104 via member 106. Member 106 extends from manifold 102 to primary element 104 and conveys process fluid from each port of primary flow element 104 to manifold 102. Member 106 is also coupled to head plate 108, which is preferably a "pressure retaining/structural" member. Head plate 108 has a pair of ends 110, 112 where each end has a respective mount for a drive rod 114, 116. Drive rods 114, 116 engage cooperative drives within assembly 118, such that primary flow element 104 as well as process pressure transmitter 12 can be raised and withdrawn from assembly 118. In accordance with an embodiment of the present invention, head plate 108 includes a number of vertical fins 120, which transfer heat from the process fluid in member 106 to the environment. In this way, at least some heat from the process fluid is not conducted to process pressure transmitter 12, thereby reducing the temperature to which the process fluid pressure transmitter electronics as well as its isolation fluid are exposed. Additionally, embodiments of the present invention can include both head plate 108 and process fluid flange 100 having fins in order to further increase heat flow away from the process fluid pressure transmitter in high temperature applications.

While some embodiments of the present invention have the fins manufactured integral with the manifold, it is expressly contemplated that the fins can be part of a heat transfer assembly that is affixed to the flange or head plate. Such a heat transfer assembly may be bolted, clamped, or otherwise secured to the manifold in order to provide additional heat transfer. Thus, at least some embodiments of the present invention can include a known coplanar process fluid flange coupled to a finned heat transfer assembly in order to allow higher temperature operation.

Although the present invention has been described with reference to preferred embodiments, workers skilled in the art will recognize that changes may be made in form and detail without departing from the spirit and scope of the invention.

What is claimed is:

1. A process fluid pressure measurement system comprising:
   a process fluid pressure transmitter having a pair of process fluid ports disposed in a plane with one another on a surface thereof, the process fluid pressure transmitter being configured to measure a differential pressure between the pair of process fluid ports and provide an indication of the measured differential pressure over a process communication loop;
   a process fluid flange having a first surface configured to mount to a bottom surface of the process fluid pressure transmitter, a second surface opposed to the first surface configured to fluidically couple to impulse lines which connect to a process fluid pipe, and a lateral sidewall extending between the first and second surface; and
   a plurality of fins extending from the lateral sidewall, the plurality of fins extending between the first surface and the second surface of the process fluid flange and oriented at a perpendicular angle to a plane defined by the first surface and at a perpendicular angle to a plane defined by the second surface.

2. The process fluid pressure measurement system of claim 1, wherein the second surface is mounted to a valve manifold conveying process fluid from a pair of ports of a primary flow element.

3. The process fluid pressure measurement system of claim 2, wherein the primary flow element is an averaging pitot tube primary flow element.

4. The process fluid pressure measurement system of claim 2, wherein the primary flow element is an orifice plate.

5. The process fluid pressure measurement system of claim 1, wherein each fin extends completely from the first surface to the second surface.

6. The process fluid pressure measurement system of claim 5, wherein each fin extends in a direction perpendicular to the surface of the process fluid pressure transmitter.

7. The process fluid pressure measurement system of claim 6, wherein at least one fin includes an aperture extending transversely therethrough.

8. A process fluid flange for coupling a process pressure transmitter to a process, the process fluid flange comprising:
   a first surface configured to mount to the process fluid pressure transmitter, the first surface having a pair of process fluid ports configured to bring process fluid to isolator diaphragms of the process fluid pressure transmitter;
   a second surface opposed to the first surface, the second surface having a pair of inlets coupled to respective process fluid ports, wherein the inlets are configured to receive process fluid from impulse lines which couple to a process fluid pipe;
   at least one lateral sidewall extending between the first and second surface; and
   a plurality of fins which extend from the at least one lateral sidewall, the plurality of fins extending between the first surface and the second surface of the process fluid flange and oriented at a perpendicular angle to a plane defined by the first surface and at a perpendicular angle to a plane defined by the second surface.

9. The process fluid flange of claim 8, wherein the at least one lateral sidewall includes four lateral sidewalls.

10. The process fluid flange of claim 9, wherein each fin extends completely from the first surface to the second surface.

11. The process fluid flange of claim 8, wherein each fin extends in a direction perpendicular to a bottom surface of the process fluid pressure transmitter.

12. The process fluid flange of claim 8, wherein each fin is integral with the process fluid flange.

13. The process fluid flange of claim 8, wherein the fins are separate from but coupled to the at least one lateral sidewall.

14. The process fluid flange of claim 8, wherein at least one fin includes an aperture extending transversely therethrough.

* * * * *